(12) United States Patent
Taniguchi

(10) Patent No.: US 10,683,157 B2
(45) Date of Patent: Jun. 16, 2020

(54) CARRYING BAG

(71) Applicant: Kazuo Okamura, Tokyo (JP)

(72) Inventor: Masami Taniguchi, Tokyo (JP)

(73) Assignee: Kazuo Okamura, Tokyo (JP)

( * ) Notice: Subject to any disclaimer, the term of this patent is extended or adjusted under 35 U.S.C. 154(b) by 0 days.

(21) Appl. No.: 15/574,727

(22) PCT Filed: Nov. 30, 2015

(86) PCT No.: PCT/JP2015/083661
§ 371 (c)(1),
(2) Date: Nov. 16, 2017

(87) PCT Pub. No.: WO2017/081830
PCT Pub. Date: May 18, 2017

(65) Prior Publication Data
US 2018/0257843 A1    Sep. 13, 2018

(30) Foreign Application Priority Data

Nov. 9, 2015 (JP) .................... 2015-219388

(51) Int. Cl.
*B65D 33/00* (2006.01)
*B65D 81/36* (2006.01)
(Continued)

(52) U.S. Cl.
CPC ................ *B65D 81/36* (2013.01); *B42F 7/02* (2013.01); *B42F 9/00* (2013.01); *B65D 33/08* (2013.01);
(Continued)

(58) Field of Classification Search
CPC ........ B65D 27/08; B65D 27/10; B65D 27/34; B65D 27/36; B65D 33/04; B65D 75/58;
(Continued)

(56) References Cited

U.S. PATENT DOCUMENTS 2,503,592 A * 4/1950 Pate ...................... B65D 27/00
229/67.1
4,867,215 A * 9/1989 Macieowitz ............. A45C 3/00
150/112
(Continued)

FOREIGN PATENT DOCUMENTS

JP    3109930 U    6/2005
JP    3112733 U *  8/2005
(Continued)

OTHER PUBLICATIONS

JP3112733UTranslation (Year: 2005).*
International Search Report for International application No. PCT/JP2015/083661, dated Mar. 8, 2016.

*Primary Examiner* — Jes F Pascua
*Assistant Examiner* — Nina K Attel
(74) *Attorney, Agent, or Firm* — Greer, Burns & Crain, Ltd.

(57) ABSTRACT

A shopping bag is provided that can be transformed for use as a file holder for storing documents and items such as a large envelope. The shopping bag includes a rectangle-shaped body part formed by a pair of front and back sheets, handles provided to the open side of the body, and a file part that is integrally formed with the body and that is turned into a rectangle-shaped file holder when separated from the body. The file part includes a separation line to be used for separating the file part from the body, a joint line formed inside of the separation line along the two sides of the separation line, at which the front and back sheets are joined together, and a cut-out part formed as a part of the separation line to be used as a starting point for separating the file part from the body.

4 Claims, 5 Drawing Sheets

(51) Int. Cl.
    *B42F 7/02*   (2006.01)
    *B42F 9/00*   (2006.01)
    *B65D 33/08*  (2006.01)
    *B65D 33/12*  (2006.01)

(52) U.S. Cl.
    CPC .......... *B65D 33/12* (2013.01); *B42P 2201/08* (2013.01); *B42P 2201/10* (2013.01); *B42P 2201/12* (2013.01); *B42P 2241/16* (2013.01); *Y02W 30/805* (2015.05)

(58) Field of Classification Search
    CPC ............ B65D 75/5805; B65D 75/5811; B65D 75/5816; B65D 75/5822; B65D 75/5827; B65D 75/5833; B65D 33/004
    USPC ... 383/2, 4, 106, 37–40, 200, 207, 209, 907; 229/67.1, 69, 72, 314, 81, 70, 300, 301, 229/304, 305; 40/124.06; 206/232, 425
    See application file for complete search history.

(56) References Cited

U.S. PATENT DOCUMENTS

2014/0334748 A1* 11/2014 Sasaki ................ B65D 75/008
                                                      383/61.3
2015/0265015 A1*  9/2015 Lee .................... A45C 7/0077
                                                      190/107

FOREIGN PATENT DOCUMENTS

| JP | 3112733 U    | 8/2005  |
| JP | 2010120358 A | 6/2010  |
| JP | 2013159349 A | 8/2013  |
| JP | 3199977 U    | 10/2015 |

* cited by examiner

CARRYING BAG

BACKGROUND

The present invention relates to a shopping bag that can be used as a file holder in which papers, documents, and the like can be stored, and that can be used as a slim-object carry bag in which relatively thin materials can be retained if the bag will no longer be used as a shopping bag.

It is a common practice for a store to put into a shopping bag a product that a customer has bought. Often stores offers shopping bags on which are printed an attractive design favored by customers and/or a brand mark unique to each store. Such bags are sometimes reused by customers as a daily-use carry bag. The prior-art inventions for reuse of a shopping bag are disclosed, for example, in Patent Documents 1 and 2, in which if the shopping bag will no longer be used for carrying something, it is transformed to be used as an envelope, a document file, a book jacket, and the like. In the prior-art inventions, after an envelope or a document file has been created from a shopping, the remaining part of the bag is discarded as trash.

However, there is a need for a convenient way to hold and carry a large envelope and/or other materials. For example, when a large envelope into which a thick document such as a catalog to be presented to a client has been put is being carried, if the envelope is directly held by a hand of the person carrying the envelope, the envelope might get stained by sweat and/or oil from the carrier's hand, or the envelope might get wrinkled because it is firmly held by the carrier. Accordingly, there is a need for a convenient bag-like item that can be used to hold and carry large envelopes and that is not as bulky as a briefcase or a paper bag, and that can be folded to be put into a coat pocket after use.

PRIOR-ART DOCUMENTS

Patent Documents

Patent Document 1: Japanese Registered Utility Model No. 3109930

Patent Document 2: Japanese Unexamined Patent Application Publication No. 2013-159349

SUMMARY

Technical Problems to be Overcome

In view of the deficiencies and shortcomings of the above-mentioned prior-art for reuse of shopping bags, there is thus a present need for a shopping bag that can be used like a file holder in which papers, documents, and the like can be stored, and that also can be transformed into a useful tool for daily-life use, such as for keeping and carrying large envelopes and other relatively thin materials if the shopping bag will no longer be used for carrying something.

Solution to the Problems

A shopping bag according to an embodiment of the present invention, intended to achieve one of the objectives mentioned above, includes a rectangular body part formed by a pair of front and back sheets, with one side of four outer peripheral sides being open, and the three other sides being closed, thereby being formed as a bag. A handle is provided to the open side of each sheet of the body part, and a file part is integrally formed with the body part and converted into a rectangular file holder when separated from the body part. The file part includes a separation line that is provided inside the four outer peripheral sides of the body part, that is generally rectangle shaped, and that is to be used for separating the file part from the body part, a joint line formed inside of the separation line, along the two sides of the separation line, the two sides being at right angles to each other, at which the front and back sheets are joined together, a cut-out part that is formed as a part of the separation line and that is to be used as a starting point to separate the file part from the body part, and wherein into the body part from which the file part has been separated along the separation line, an external object such as a bag-shaped body formed by a sheet, an envelope, or the like are inserted from the opened side of the four outer peripheral sides, so that the external object can be held by means of the three other peripheral sides.

It is preferable that the separation line is altered (1) at any portion of itself so as to have a convex shape, or (2) at a corner of the file part so as to form a clamping piece that is created after the file part has been separated from the body part, with two clamping pieces being used as a pair to sandwich the external object.

It is preferable that a cut-limit part is provided near the cut-out part that is formed as a part of the separation line so as to prevent a shopping bag from being accidentally broken while it is carrying something, the cut-limit part being formed by bending the separation line substantially at a right angle. Also, the body part is preferably formed of a semi-rigid resin material. The front and back sheets that form the body part are preferably printed in color.

A shopping bag according to another embodiment of the present invention, intended to achieve one of the objectives mentioned above, includes a rectangular body part formed by a pair of front and back sheets, with one side of four outer peripheral sides being open, the side opposite to the open side forming a bottom part, the bottom part being made by bonding the front and back sheet together, and the other two sides being closed, thereby being formed as a bag. A handle is provided to the open side of the body part, and a file part is integrally formed with the body part, and turned into a rectangular file holder when separated from the body part. The file part includes a separation line used to separate the file part from the body part, the file part being defined by the separation line and the two closed sides of the body part that are formed by the bottom part of the body part and the other side adjacent to the bottom part, a cut-out point formed at a portion of the bottom part where the separation line intersects with the bottom part, to be used as a starting point to separate the file part from the body part, and a cut-limit part formed on the separation line near the cut-out point provided to the bottom part so as to prevent the body part from being broken while the carrying bag is carrying something, even if the bag begins to break at the cut-out point, and wherein into the body part from which the file part has been separated along the separation line, an external object such as a bag-shaped body formed by a sheet, an envelope, and the like are inserted from the opened side of the four outer peripheral sides, so that the external object can be held by means of the other peripheral sides.

It is preferable that the separation line is altered (1) at any portion of itself so as to have a convex shape, or (2) at a corner of the file part so as to form a clamping piece that is created after the file part has been separated from the body part, with two clamping pieces being used as a pair to sandwich the external object. The cut-limit part is formed by bending the separation line substantially at a right angle. It is preferable that the body part is formed of a semi-rigid resin material, and that the front and back sheets that form the body part are printed in color.

Advantageous Effects of the Invention

The present invention provides the advantages that (1) a part of a shopping bag is separated to produce a file holder, similar to a clear file holder, that has two face sheets that can open in opposite directions, and that show the original design that is printed on the shopping bag, and (2) the part of the shopping bag that remains after the file holder has been separated from the shopping bag can be used as a convenient, portable means of carrying one or more relatively thin materials, such as a large envelope, allowing the used shopping bag to be reused.

BRIEF DESCRIPTIONS OF THE DRAWINGS

DETAILED DESCRIPTION

Figure 1:
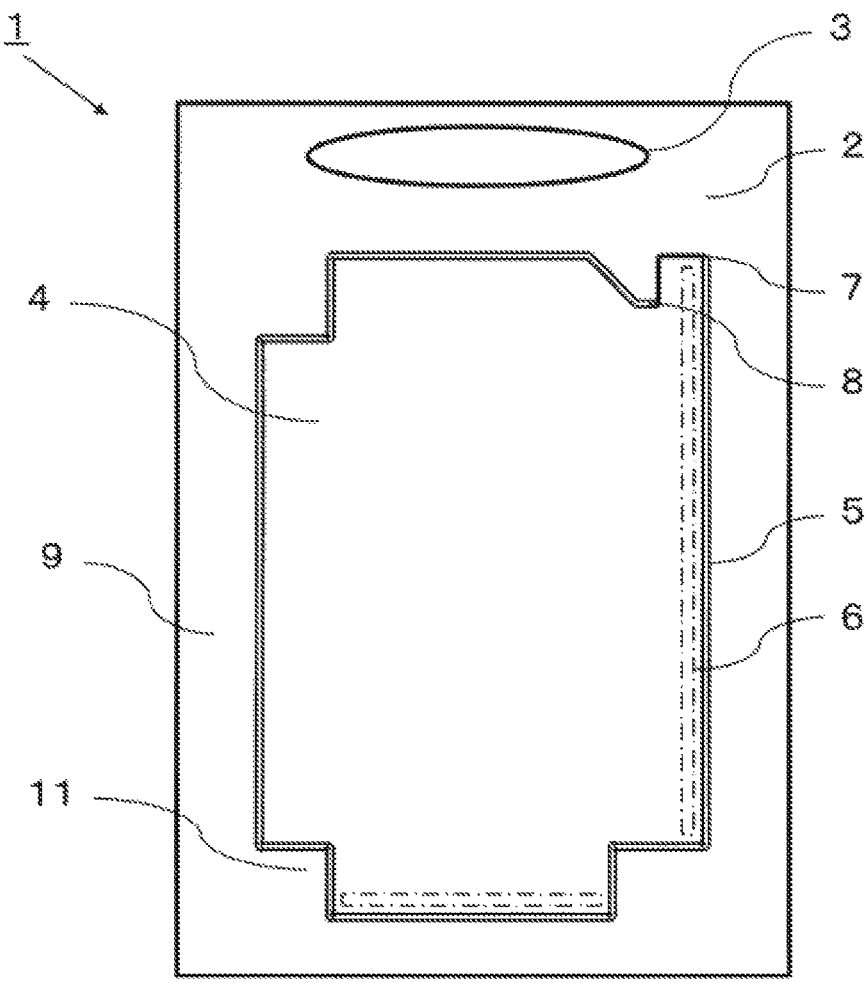
FIG. 1 is a schematic plan-view drawing that illustrates a shopping bag according to an embodiment of the present invention.
Figure 2:
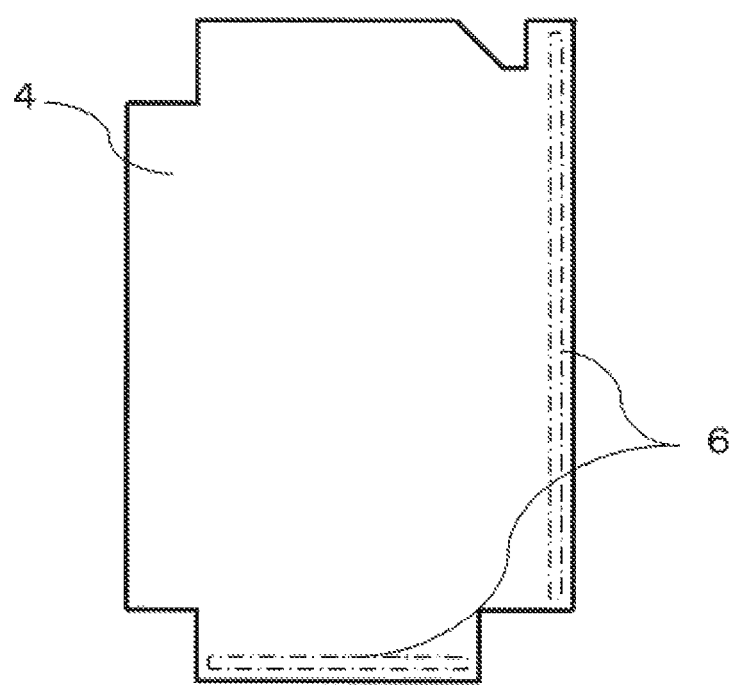
FIG. 2 is a schematic view drawing that illustrates a file holder separated from the shopping bag shown in FIG. 1.
Figure 3:
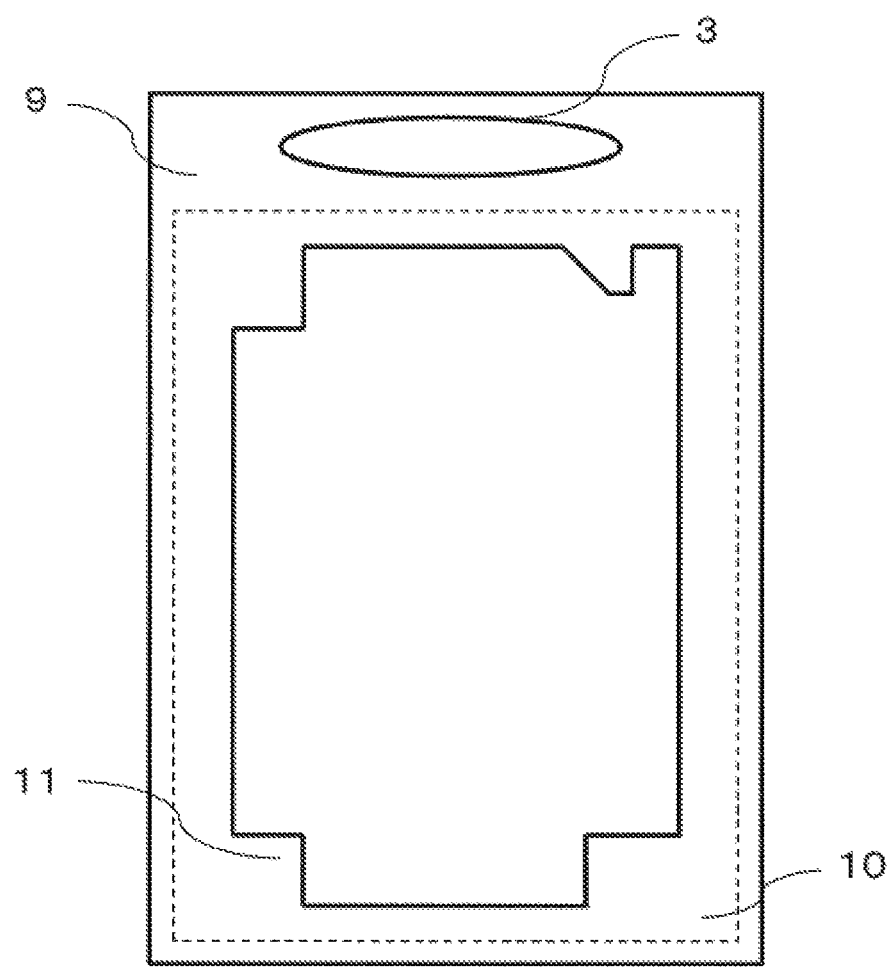
FIG. 3 is a schematic view drawing that illustrates a slim-object carry bag produced from the shopping bag shown in FIG. 1.

The preferred embodiments of the present invention will now be described in more detail with reference to the drawings. These embodiments are provided to explain the present invention, but the present invention is not intended to be limited to these embodiments. With reference to FIGS. 1-3, a shopping bag 1 according to a first embodiment will be explained. The shopping bag 1 includes (1) a rectangle-shaped body part 2, which is formed by a pair of front and back sheets, wherein one side of the four outer peripheral sides is open, and the three other sides are closed, thereby being formed as a bag, (2) a handle 3 that is provided to the open side of the body part 2 in such a way that the handle 3 is formed by cutting out a part of the sheet, and (3) a file part 4, which is integrally formed with the body part 2, and is turned into a rectangle-shaped file holder when separated from the body part 2. The file part 4 includes (1) a separation line 5 that is provided inside the four outer peripheral sides of the body part 2, and that is formed generally by four sides that to be used for separating the file part 4 from the body part 2, (2) a joint line 6, which is formed inside of the separation line 5 along two sides of the separation line 5, the two sides being at right angles to each other, and at which the front and back sheets are joined together, (3) a cut-out part 7, which is formed as a part of the separation line 5, and is used as a starting point for separating the file part 4 from the body part 2, and (4) a cut-limit part 8, which is provided near the cut-out part 7 that is formed as a part of the separation line 5, in order to prevent a shopping bag from being broken while the shopping bag is carrying something, even if the bag begins to break at the cut-out part 7. The body part 2, from which the file part 4 has been separated along the separation line 5 forms a material(s) holding part 9, into which an external object 10, such as an envelope, a bag-shaped body formed by a sheet, or the like, can be inserted from outside via the open side of the four outer peripheral sides, so that the material(s) holding part 9 is able to hold the external object 10 by means of the three other peripheral sides.

The generally four-sided separation line 5, along which the file part 4 is to be separated from the body part 2, is formed by, for example, a perforated broken line, a perforated dashed-dotted line, a perforated dashed-and-double-dotted line, or a printed dashed line. The perforated lines are preferably used as the separation line 5 so that the file part 4 is easily separable from the body part 2. If the separation line 5 is formed by, for example, a printed dashed line, and the file part 4 is not easily separable from the body part 2 by hand, a cutting tool such as scissors or a utility knife can be used to separate the file part 4 from the body part 2.

The joint line 6, along which the front and back sheets are joined together, is formed along the two sides of the separation line 5, that are inside of the separation line 5, the two sides being at right angles to each other. Two side edges of the front sheet and the back sheet are linearly joined along the joint line 6, so that the joint line 6 functions as a joining part of the file holder, whereby the resulting file holder has two faces that can open in opposite directions along the joint line 6. The front and back sheets are joined using an adhesive, or by heat adhesion using a heat sealer.

The cut-out part 7, which is the part used when starting to separate the file part 4 from the body part 2, is formed as a part of the separation line 5. The separation line 5 is cut out at this part first, before the whole file part 4 is separated along the separation line 5. The cut-out part 7 is preferably provided at a corner of a rectangle formed by the separation line 5 together with the cut-limit part 8, which is provided near the cut-out part 7. The cut-limit part 8 is preferably formed such that the separation line 5 is bent generally at a right angle, so that the cut-limit part 8 prevents the file part 4 from being cut off along the separation line 5 if the cutting-off of the file part 4 accidentally begins at the cut-out part 7, thereby preventing the shopping bag from being broken. The cut-limit part 8 may be provided to either face or both faces of the front and back sheets. Also, the cut-limit part 8 is not limited to near the cut-out part 7, and it can be provided to multiple portions of the separation line 5, to prevent the continuation of cutting-off along the separation line 5 if cutting-off starts accidentally. The shape of the separation line 5 to which the cut-limit part 8 is provided is optional, as long as the separation line 5 is bent substantially at a right angle so as to form the cut-limit part 8, whereby the separation line 5 to form the cut-limit part 8 may have a triangular, circular, or arc shape extending into the inside of the file part 4.

The separation line 5 may be formed so as to create a semicircular or triangular notch part, which allows one sheet face of the file holder that has been separated from the file part 4 to be easily turned over. Also, the separation line 5 is preferably formed so as to create a clamping piece 11 that is located at a part of the separation line 5 or at a corner of the file part 4, and that extends to the inside of the body part 2. Two clamping pieces 11 are used as a pair to sandwich the external object 10, as a part of the material(s) holding part 9 of the body part 2 after the file part 4 has been separated from the body part 2.

The size of the file part 4 is not specifically limited as long as the size does not exceed that of the shopping bag. But in view of the use of the file part 4 as a file holder, the size preferably corresponds to that of A4 paper or B5 paper, as desired. Also, the size of the body part 2 is not specifically limited, but preferably is one or two ISO sizes larger than the size of the file part 4; i.e., if the size of the file part 4 corresponds to the size of A4 paper, the size of the body part 2 preferably corresponds to the size of B4 or A3 paper, as appropriate. In addition, the size of the body part 2 is preferably such that the body part 2 can store, for example, an A3-size or B4-size envelope, as desired. This size configuration enhances the usability of the carry bag as a slim-object carry bag.

According to the present embodiment, the handle 3 is provided to the open side of the four outer peripheral sides of the body part 2, and in the shopping bag 1 shown in FIG. 1, the handle 3 is an opening formed near the open side. However, the handle may be configured to be, for example, string-shaped, and may also be provided to the open side of the peripheral sides of the body part 2. In addition, each handle 3 that has an open shape near said open side, and by which the shopping bag 1 is held, may be provided with ring-shaped materials or strong materials so as to surround the opening part.

The material to form the body part 2 is not specifically limited, but, for example, paper, resin, leather, fabric, wood, metal, or the like may be used. Because it is preferable that the material to be used for a shopping bag is (1) hard enough to prevent the shopping bag from losing its shape, (2) flexible enough to allow a product to be easily put into or removed from the shopping bag, and (3) reusable as a file holder or as a slim-object carry bag, it is preferable that the material used for the shopping bag is a semi-rigid resin or is a thick paper. If the handle 3 is configured so as to be string-shaped, it is not necessary that its material be the same as the material of the body part 2. The image of a product, a brand or logo mark, and/or other design work relating to the product to be put in the shopping bag are preferably printed in color on the front and/or back sheets that form the body part 2, which would enhance the popularity of the shopping bag, the file holder, or the slim-object carry bag among the users thereof.

After the file part 4 has been cut out from the body part 2, there remains the material(s) holding part 9, into which an external object 10 such as a sheet of paper or an envelope can be inserted through the open side of the four outer peripheral sides of the material(s) holding part 9, whereby the external object 10 is supported by the three closed outer peripheral sides, the external object 10 being transformed into a slim-object carry bag. The usability of the slim-object carry bag is enhanced because of the handle provided thereto. The slim-object carry bag is also suitable for carrying a large-size sketchbook or a drawing board if an appropriate size envelope is inserted into the material(s) holding part 9.

Figure 4:
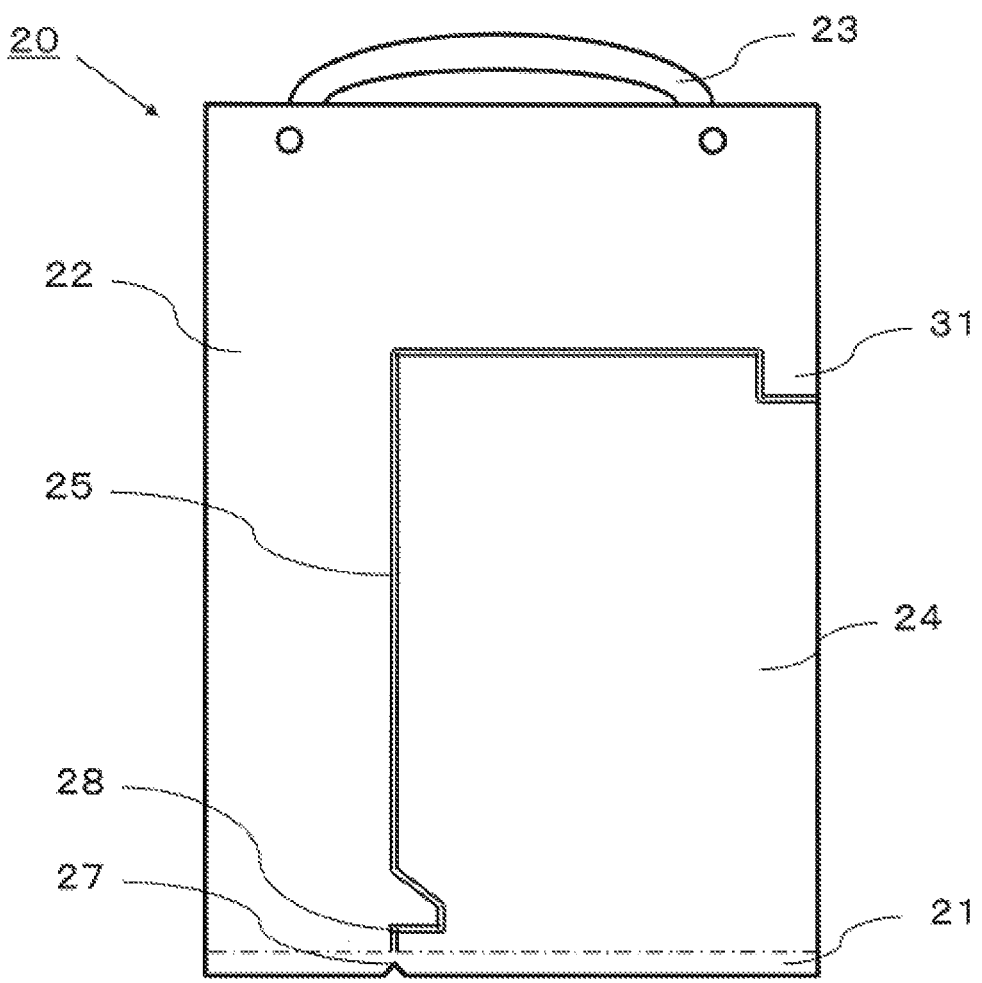
FIG. 4 is a schematic plan view drawing that illustrates a shopping bag according to another embodiment of the present invention.

FIG. 4 is a schematic plan view drawing that illustrates a shopping bag 20 according to another embodiment of the present invention. The shopping bag 20 according to this embodiment includes: (1) a rectangle-shaped body part 22, which is formed by a pair of front and back sheets, wherein one side of the four outer peripheral sides is open, with the side opposite to the open side forming a bottom part 21 that is made by bonding the front and back sheets together, with the other two sides being closed, so as to be formed as a bag, (2) handles 23, which are provided to the open sides of the body part 22 and of which are string-shaped, and (3) a file part 24, which is integrally formed with the body part 22 and is changed to a rectangle-shaped file holder when separated from the body part 22, wherein the file part 24 includes [1] a separation line 25 used to separate the file part 24 from the body part 22, the file part 24 being defined by the separation line 25 and by two closed sides of the body part 22 that are formed by the bottom part 21 of the body part 22 and the other side adjacent to the bottom part 21, [2] a cut-out point 27 that is formed where the separation line 25 intersects with the bottom part 21, and is to be used as a starting point to separate the file part 4 from the body part 22, and [3] a cut-limit part 28 that is formed on the separation line 25 near the cut-out point 27 that is provided to the bottom part 21 so as to prevent the body part 22 from being broken while the shopping bag is carrying something, even if the bag begins to break at the cut-out point 27.

Figure 5:
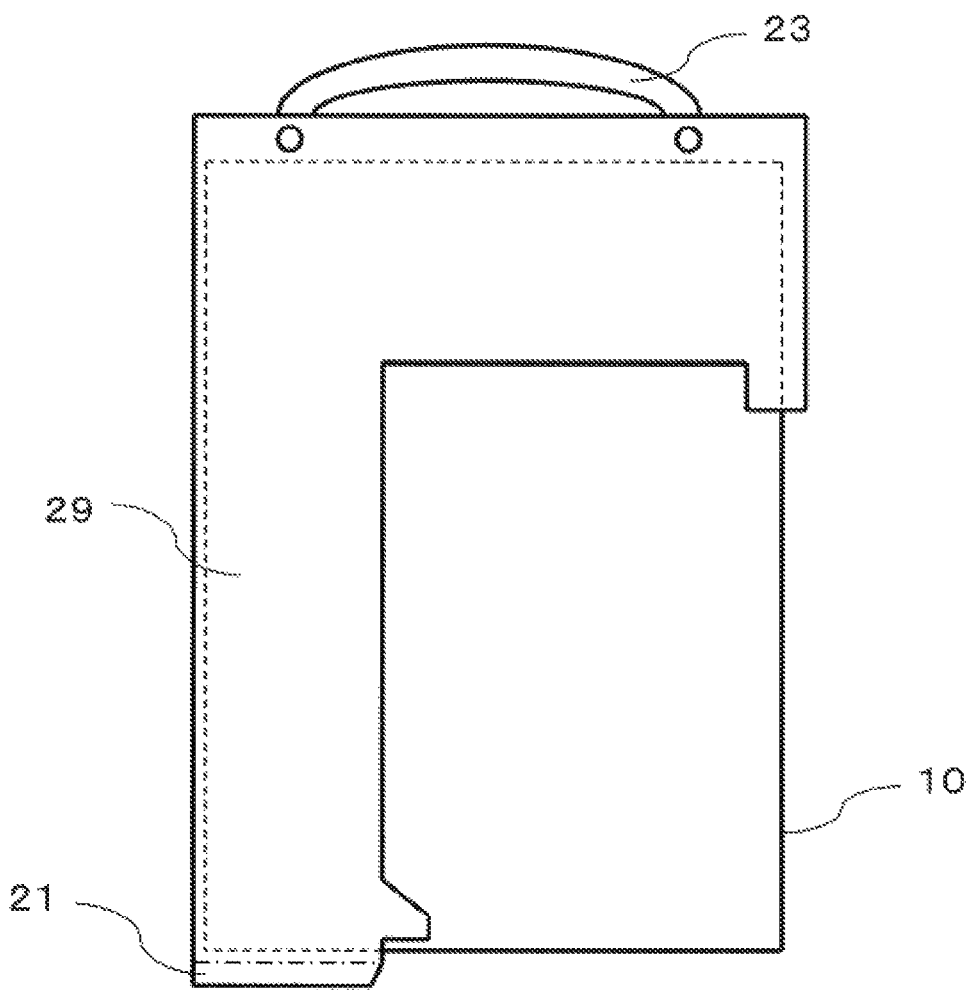
FIG. 5 is a schematic view drawing that illustrates a slim-object carry bag produced from the shopping bag shown in FIG. 4.

FIG. 5 is a schematic view drawing that illustrates a slim-object carry bag produced from the shopping bag 20 shown in FIG. 4. The part of the body part 22 that remains after the file part 24 has been separated from the body part 22 along the separation line 25 is transformed into a material(s) holding part 29, into which an external object 10 such as an envelope, a bag-shaped body formed by a sheet, or the like can be inserted from the open side of the outer peripheral sides, so that the material(s) holding part 29 is able to hold the external object 10 by using the other peripheral side portions. The separation line 25, along which the file part 4 is to be separated from the body part 22, is formed by, for example, a perforated broken line, a perforated dashed-dotted line, a perforated dashed-and-double-dotted line, or a printed dashed line. The perforated lines are preferably used as the separation line 5 so that the file part 4 can be easily separated from the body part 2. If the separation line 25 is formed by, for example, a printed dashed line, and the file part 24 is not easily separable from the body part 22 by hand, a cutting tool such as scissors or a utility knife can be used to cut out the file part 24 from the body part 22.

The cut-out point 27, which is used as a starting point to separate the file part 24 from the body part 22, is provided to the bottom part 21. It is preferable that the cut-limit part 28 is provided to the separation line 25 near the cut-out point 27, and that the cut-limit part 28 is configured such that the separation line 25 is bent substantially at a right angle, whereby the cut-limit part 28 prevents the file part 24 from being cut off from the body part 22 along the separation line 25, even if the cutting off of the file part 24 accidentally begins at the cut-out point 27, thereby preventing the shopping bag from being broken. The cut-limit part 28 can be provided to either or both faces of the front and back sheets. The shape of the separation line 5 to which the cut-limit part 8 is provided is optional as long as the separation line 5 is bent substantially at a right angle so as to define the cut-limit part 8. The shape of the separation line 5 to form the cut-limit part 8 may be triangular, circular, or arc in shape, extending into the inside of the file part 24. The separation line 25 may be formed so as to create a notch part that is semicircular or triangular, which allows one sheet of the file holder that has been separated from the file part 24 to be easily turned over to show its other face.

The shopping bag 20 according to the present embodiment may be used with a binder. If the shopping bag 20 is carrying a product, the binder is used as a clasp to close the open side of the outer peripheral sides of the shopping bag 20. When the slim-object carry bag is used after the file part 24 has been separated from the body part 22, the binder is used so that it sandwiches the front and back sheets of the material(s) holding part 29 together with the external object 10, so as to firmly hold the external object 10. The size of the binder used is not specifically limited, and it may vary so as to allow the binder to cover only a part of the external object 10, or to allow the binder to sandwich the entire open side of the shopping bag 20. However, it is preferable that the size of the binder is small enough to be put into a pocket with the folded slim-object carry bag, in order that the binder can be portable. The size of the file part 24, the shape of the handle 23, and the materials of the shopping bag 20 are the same as the corresponding elements of the first embodiment of the shopping bag 1.

The present invention provides the advantages that (1) a part of a shopping bag is separable to produce a file holder, similar to a clear file holder, which has two face sheets that can open in opposite directions and show the original design that is printed on the shopping bag, and (2) although in the prior-art the part of the shopping bag that remains after the file holder has been separated from the shopping bag has been discarded, the present invention utilizes the otherwise-discarded part of the shopping bag as a portable, convenient carry bag that can carry relatively thin materials such as a large envelope, allowing the used shopping bag to be reused. The present invention thus adds value to shopping bags that stores provide to customers, and therefore contributes to promote the sales in the stores.

DESCRIPTIONS OF THE REFERENCE NUMBERS 1, 20 shopping bag
2, 20 body part
3, 23 handle
4, 24 file part
5, 25 separation line
6 joint line
7 cut-out part
8, 28 cut-limit part
9, 29 material(s) holding part
10 external object
11, 31 clamping piece
21 bottom part
27 cut-out point

The invention claimed is:
1. A shopping bag comprising:
a rectangle-shaped body part formed by a pair of front and back sheets, one side of four outer peripheral sides being open, and the three other sides being closed, thereby being formed as a bag;
a handle provided to the open side of each sheet of the body part;
a file part integrally formed in a generally rectangle shape inside the four outer peripheral sides of the body part, and turned into a generally rectangular file holder when separated from the body part;
wherein the file part comprises a separation line provided inside the four outer peripheral sides of the body part, and being generally rectangle shaped, the separation line being defined on both the front sheet and the back sheet of the body part, and used for separating the file part from the body part,
a joint line formed inside of the separation line along two sides of the separation line, the two sides of the separation line being at right angles to each other, at which the front and back sheets are joined together,
a cut-out part that is formed as a part of the separation line and that is to be used as a starting point for separating the file part from the body part, and
wherein into the body part from which the file part has been separated along the separation line, an external object such as a bag-shaped body formed by a sheet, may be inserted from the open side of the four outer peripheral sides, so that the external object is held by means of the three other peripheral sides, and
wherein a portion of the separation line that is located on the side opposite to the handle, is altered at at least one corner of the file part to an inward portion of the file part, so that the separation line has a convex shape at the at least one corner to form at least one clamping piece on each of the front and back sheets of the body part, whereby after the file part has been separated from the body part, the clamping pieces of the body part are used to sandwich the external object.

2. The shopping bag according to claim 1, wherein a cut-limit part is provided near the cut-out part formed as a part of the separation line, so as to prevent a shopping bag from being accidentally broken while the shopping bag is carrying something, the cut-limit part being formed by bending the separation line substantially at a right angle.

3. The shopping bag according to claim 1, wherein the body part is formed of a semi-rigid resin material.

4. The shopping bag according to claim 1, wherein the front and back sheets that forms the body part are printed in color.

* * * * *